United States Patent [19]
Liubakka et al.

[11] Patent Number: 5,979,587
[45] Date of Patent: Nov. 9, 1999

[54] ELECTRICALLY ASSISTED POWER STEERING APPARATUS

[75] Inventors: Michael Kenneth Liubakka, Livonia; Alexander Timofeevich Zaremba, Dearborn Heights, both of Mich.

[73] Assignee: Ford Global Technologies, Inc., Dearborn, Mich.

[21] Appl. No.: 08/869,288

[22] Filed: Jun. 6, 1997

[51] Int. Cl.⁶ .................................................. B62D 5/04
[52] U.S. Cl. ......................... 180/446; 318/433; 318/621
[58] Field of Search ......................... 180/446; 701/42

[56] References Cited

U.S. PATENT DOCUMENTS

| | | | |
|---|---|---|---|
| 4,125,799 | 11/1978 | Harduvel | 318/621 |
| 4,645,026 | 2/1987 | Adams | 180/132 |
| 4,660,671 | 4/1987 | Behr et al. | 180/142 |
| 4,913,250 | 4/1990 | Emori et al. | 180/79.1 |
| 4,940,103 | 7/1990 | Momiyama | 180/79.1 |
| 5,135,068 | 8/1992 | Emori et al. | 180/132 |
| 5,307,892 | 5/1994 | Phillips | 180/79.1 |
| 5,467,279 | 11/1995 | Wada et al. | 364/424.85 |
| 5,473,231 | 12/1995 | McLaughlin et al. | 318/433 |
| 5,473,539 | 12/1995 | Shimizu et al. | 364/424.05 |
| 5,480,000 | 1/1996 | Daido et al. | 180/79.1 |
| 5,482,129 | 1/1996 | Shimizu | 180/79.1 |
| 5,590,732 | 1/1997 | Sugino et al. | 180/444 |

OTHER PUBLICATIONS

"Effects of Adding Poles and Zeros to Transfer Functions", Automatic Control Systems, 7th Ed., B. Kuo, pp. 415–441.

*Primary Examiner*—Robert J. Oberleitner
*Assistant Examiner*—Daniel Yeagley
*Attorney, Agent, or Firm*—Gregory P. Brown

[57] ABSTRACT

An electronically assisted power steering system (10) for providing assist in response to a steering control signal includes a steering torque sensor (30) operatively connected to a vehicle hand wheel (12) for providing a torque signal indicative of applied steering torque. An electric motor control module (50) is connected to the torque sensor (30) and to an electric motor (32). The electric motor control module (50) includes an outer loop controller for generating a desired torque signal responsive to the applied steering torque. The outer loop controller includes a phase lag network in series with a second order network for compensating the desired torque signal. The electric motor control module (50) also includes an inner loop controller for generating a motor drive signal responsive to the desired torque signal output from the outer loop controller. The inner loop applies a motor drive signal to the electric motor to generate the required assistive torque.

12 Claims, 3 Drawing Sheets

ELECTRICALLY ASSISTED POWER STEERING APPARATUS

BACKGROUND OF THE INVENTION

1. Field of the Invention

This invention relates generally to a steering apparatus for use in a motor vehicle. More particularly, the present invention relates to an electrically assisted power steering apparatus for providing assistive torque for steering a motor vehicle.

2. Disclosure Information

Electrically assisted steering systems are well known in the art. The primary function of any power assist steering device is to provide a predetermined desired assistive torque or force to the steering mechanism to reduce the effort required by the operator. Hydraulic systems accomplish this task using a network of complex hydraulic circuits to achieve a desirable boost curve. The boost curve relates the amount of assist torque that is to be generated for a given operator input torque. This curve is generally non-linear, providing low gain when the operator applies low torque, and with the gain increasing substantially as the operator applies more and more torque. Essentially, this results in low assist by the power steering system during high speed operation, allowing for what is characterized as good steering feel. Generally, it is difficult for an operator to generate high input torque while the vehicle travels at higher speeds, as vehicles are generally very responsive to steering input when at speed.

On the other hand, it is quite common for an operator to generate considerable steering torque during low speed operation, such as parking. This is when the system must be capable of providing substantial assistive torque, in response to the high operator input torque. The typical boost curve reflects this by providing increasing gain as the steering input torque increases. An electrically assisted power steering system must perform this same function.

The performance capabilities of an electrically assisted power steering system may be characterized by its bandwidth, which is a measure of the system response time and system gain. Power assist steering systems must have sufficient bandwidth to respond seamlessly to the driver's fastest inputs while at the same time preserving the feel of the road through the mechanical steering mechanism. If dynamic steering frequency exceeds the system bandwidth, the operator will detect a degradation of the steering feel, the feel becoming "sluggish" as the electric motor can not generate the demanded assist torque. To avoid this, the system must have sufficient bandwidth while maintaining the stability and system vibrations within predetermined acceptable levels. In hydraulic power assist systems, hydraulic stability and vibrations could be controlled by lowering assist gain or by increasing damping. However, because increased fuel economy is one of the objectives of using an electrically assisted power steering system, it is desirable to seek alternatives to adding damping to control the stability and vibrations.

It would therefore be desirable to develop an electrically assisted power steering system having sufficient bandwidth to satisfy the demands of a power steering system while maintaining control system stability and vibrations within predetermined levels without employing excessive damping, thereby enhancing the fuel efficiency benefits attainable with electrically assisted power steering systems. Additionally, it would be desirable to develop a system capable of using low cost sensors and actuators without overburdening the microprocessor.

SUMMARY OF THE INVENTION

According to the present invention, a novel electrically assisted power steering apparatus for steering a motor vehicle has been discovered. This steering apparatus overcomes the need for designs which require more costly system components to deliver the desired steering system response and performance, without requiring undue amounts of damping to stabilize the control system.

The electrically assisted power steering apparatus includes a steering mechanism, a steering torque sensor for detecting a steering torque applied to a steering wheel and generating a steering torque signal. The apparatus also includes an electric motor for generating an assistive steering torque for the steering mechanism and a controller for controlling the motor. The controller includes an outer loop controller for generating a desired torque signal responsive to the steering torque signal. The outer loop controller includes a phase lag network and a second order network in series with the phase lag network. The controller also includes an inner loop controller for generating a motor drive signal responsive to the desired torque signal and applying the motor drive signal to the electric motor.

Advantageously, the electrically assisted power steering apparatus is sufficiently stable to provide the desired gain for parking maneuvers as well as high speed operation, improving the performance otherwise unobtainable with production feasible, cost efficient components.

DETAILED DESCRIPTION OF THE PREFERRED EMBODIMENT

Figure 1:
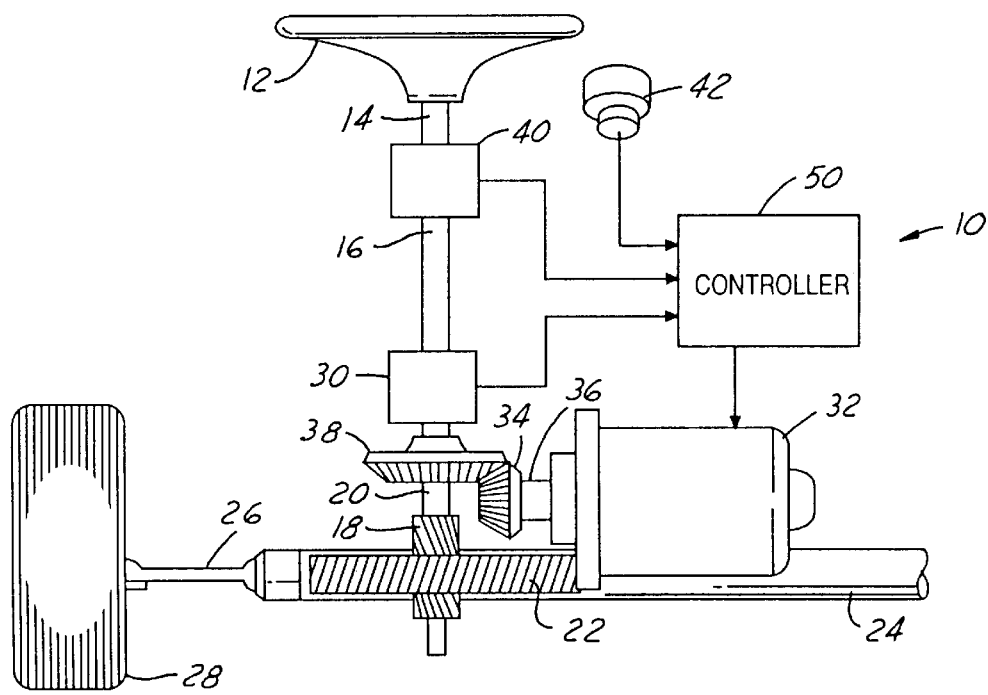
FIG. 1 is a partial elevational view of an electrically assisted power steering apparatus constructed in accordance with the present invention.

Referring to FIG. 1, an electrically assisted power steering system 10 includes a steering wheel 12 attached to a first end 14 of a steering shaft 16. A steering pinion gear 18, attached to a second end 20 of the steering shaft opposite the first end 14, engages a steering rack gear 22 of a steering rack 24. Each end of the steering rack 24 includes a tie rod 26 attached to a steerable wheel and tire assembly 28 in a conventional manner.

A steering torque sensor 30 is incorporated in the steering shaft 16 for detecting a steering torque applied by an operator to the steering shaft 16 via the steering wheel 12. One example of such a torque sensor places a torsion bar between an input shaft and an output shaft of the steering shaft, allowing for relative displacement between the input and output shafts that is proportional to the applied torque. This displacement can be measured, and given a torsional spring constant for the torsion bar, the applied torque can determined directly therefrom. The presently preferred embodiment uses a "Torkducer" noncontact rotary torque sensor commercially available from GSE, Inc. Many alternative torque sensors are known to those skilled in the art, all being capable of providing the desired functionality and operability.

Figure 2:
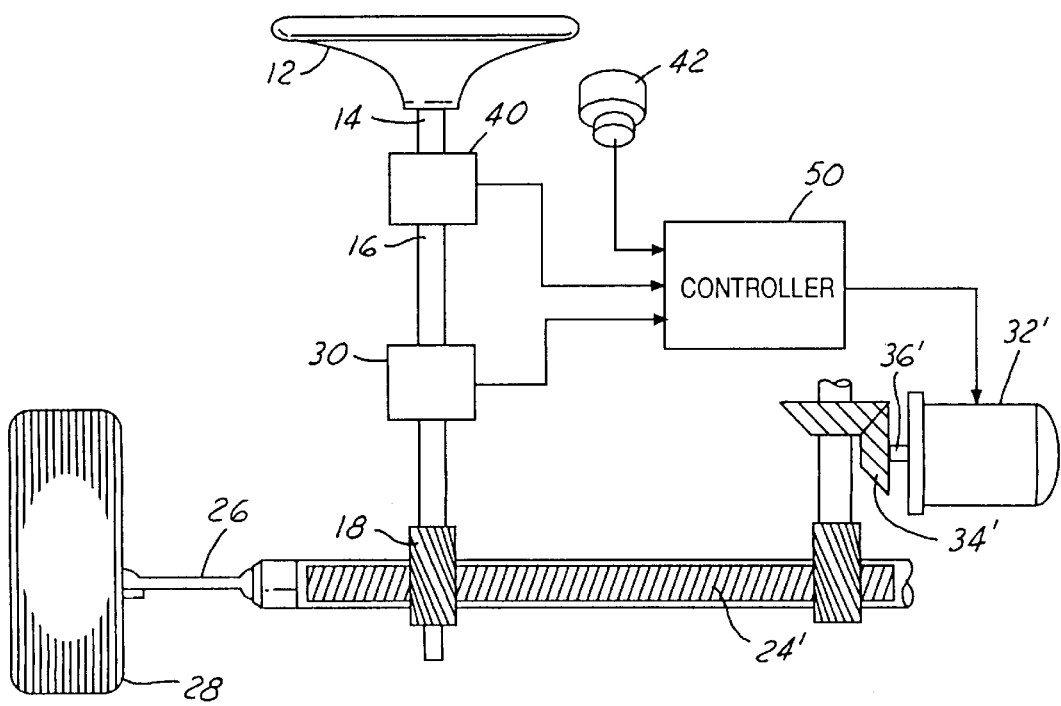
FIG. 2 is a partial elevational view of an alternative embodiment of an electrically assisted power steering apparatus constructed in accordance with the present invention.

An electric motor 32 includes a output gear 34 mounted on an output shaft 36 for drivingly engaging an assist input gear 38 mounted on the steering shaft 16. Alternatively, as shown in FIG. 2, the electric motor 32' may have its output shaft 36' and an output gear 34' arranged to directly engage the steering rack 24'. The choice between these two will primarily be driven by the available package space, as either alternative provides equivalent functionality and operability. The present invention will also provide the intended benefit when used on systems incorporating a ball screw or ball nut gear mechanism, commonly found on heavy vehicles, such as trucks.

The electric motor 32 can be a commercially available 12 volt DC brush or brushless design, available from suppliers such as Siemans, GE or Bosch. The presently preferred embodiment utilizes a three phase alternating current induction motor. It should be noted that a variable reluctance motor may be substituted for the induction motor without impacting the performance of the present invention. Induction and variable reluctance motors are desirable for use in electrically assisted power steering systems because of their low friction and high torque-to-inertia ratio compared to larger electric motors. The motor may include a motor shaft encoder for generating a signal for determining shaft position and velocity for use in various known motor control schemes. It is foreseeable, however, that the use of a sensorless motor could be advantageous, therefore the present invention allows for motors having less precise controllability.

The system may include other system sensors, including a steering wheel angle sensor 40 connected to the steering shaft 16 For providing a steering wheel angle signal indicative of the relative rotational position of the steering shaft 16. Another sensor the system may include is a vehicle speed sensor 42, typically driven by a transmission, for generating a vehicle speed signal representative of the vehicle's forward velocity. The various signals generated by the system are fed to an electric motor control module 50, which then determines a motor drive signal to actuate the electric motor 32, thereby providing the desired assist torque.

To effectively control the electrically assisted power steering system, an analytical model can provide important insight for developing the appropriate controllers. The system illustrated and described above can be mathematically represented by the following equations of motion, assuming relatively high assist stiffness:

$$J_s \ddot{\theta}_s + b_s \dot{\theta}_s + K_s \theta_s = T_d + \frac{K_s}{R_s} x$$

$$m_e \ddot{x} + b_e \dot{x} + K_e x = \frac{T_a G}{R_m} + \frac{K_s}{R_s} \theta_s + F_\delta$$

$$y = K_s \left( \theta_s - \frac{x}{R_s} \right) + v_t.$$

Where $x, m_e, b_e$ are rack displacement from equilibrium position, effective rack mass and damping, respectively; $\theta_s, J_s, K_s, b_s$ are the angle of rotation, moment of inertia, stiffness, and damping, respectively, of the steering shaft, respectively; $R_s, R_m$ are the steering pinion and output gear radii; G is the gear ratio between the output gear and the assist input gear; $T_d$ is the torque applied by the operator and $F_\delta$ is a disturbance force from the road; $T_a$ is the torque generated by the electric motor; y is an elastic torque measured on the steering shaft and $v_t$ is a measurement noise. This was the starting point for designing the novel controller in accordance with the present invention.

Figure 3:
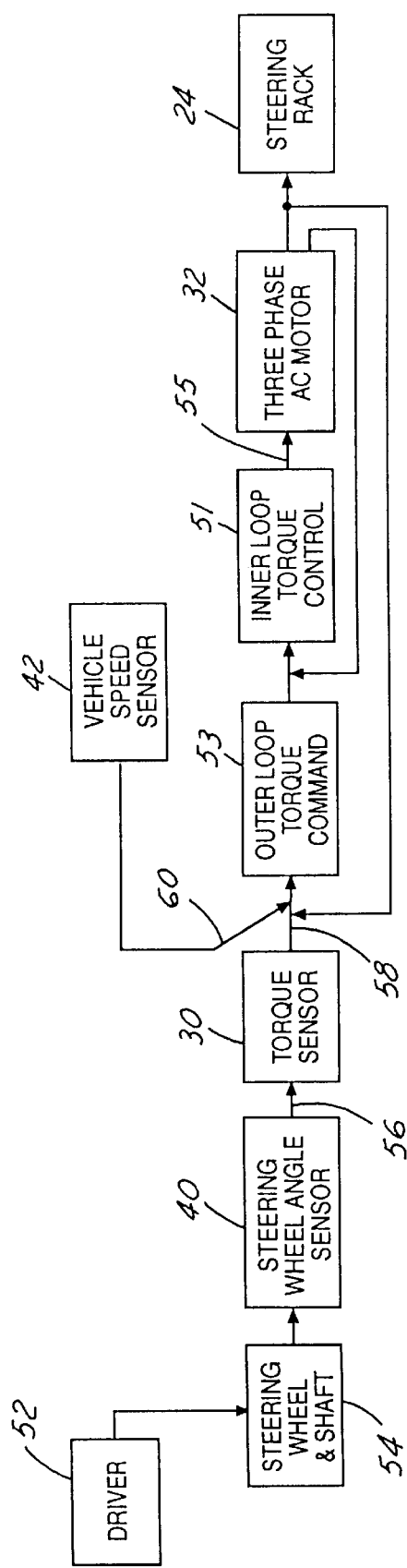
FIG. 3 is a schematic representation of an electrically assisted power steering apparatus in accordance with the present invention.

Referring now to FIG. 3, a block diagram is shown representing the control logic contained within the electric motor control module 50. The control module 50 includes an inner loop controller 51 for generating and applying a motor drive signal 55 to the electric motor 32 in response to a desired torque signal in a manner known to those skilled in the motor control arts. The desired torque signal is output from an outer loop controller 53, which computes the desired torque based on various signals generated by the system, which will be described in detail below.

Block 52 reflects the relationship between the vehicle operator and the steering wheel and steering shaft mounted within the steering column 54. As the vehicle operator maneuvers the vehicle, the steering wheel angle sensor 40 generates a steering wheel angle signal 56 to be communicated to the control module 50. Any operator efforts exerted on the steering wheel are communicated, mechanically in the preferred embodiment, to the torque sensor 30 resulting in a steering torque signal 58 being communicated to the control module 50. The vehicle speed sensor 42 also communicates a corresponding vehicle speed signal 60 to the control module. These signals are operated on by the outer loop controller 53 to generate the desired torque signal.

Figure 4:
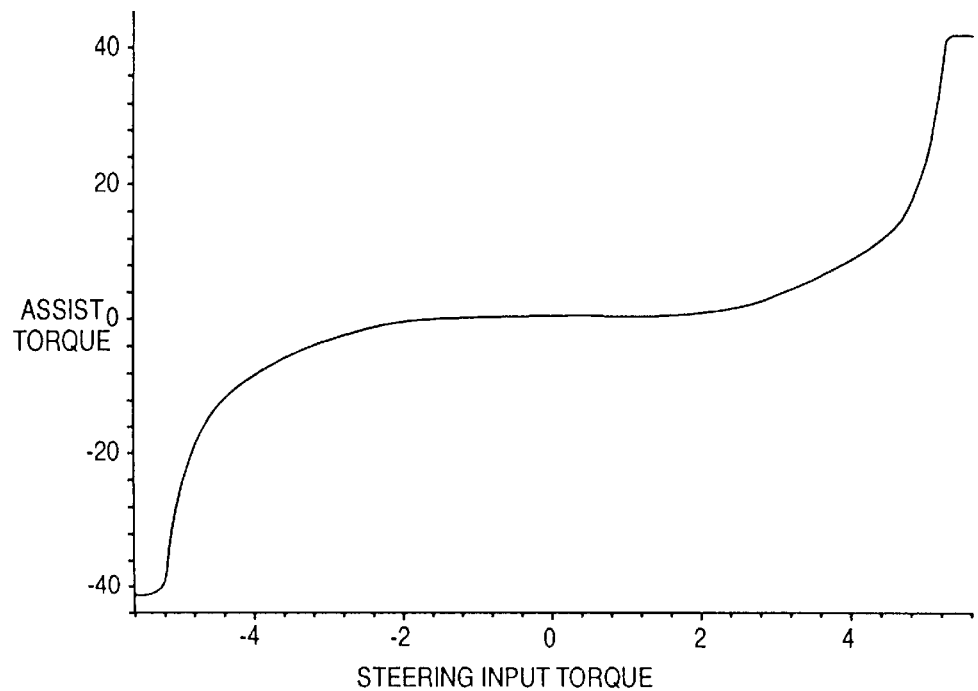
FIG. 4 is a graphical representation of a boost curve to be implemented by an electrically assisted power steering apparatus in accordance with the present invention.

Utilizing the steering torque signal 58, vehicle speed signal 60, the control module 50 determines an amount of steering assist to be generated by the electric motor 32 by referencing a look-up table stored in permanent memory. Referring to FIG. 4, data in the look-up table reflects a non-linear boost curve relating the steering torque, input by the driver, to the assist torque to be generated by the electric motor 32. Advantageously, the present invention provides sufficient operating bandwidth to utilize a single boost curve for a range of vehicle operating speeds, obviating the common need to provide speed dependent boost curves, however, it is recognized that some systems would desire varying curves for different vehicle operating conditions similar to varying vehicle speeds, such as other vehicle dynamic conditions. The present invention is flexible enough to accommodate this, however it is not necessary as with some of the prior art systems. The assist torque value obtained from the look-up table is indicative of the assist torque that should be produced by the electric motor 32. To this end, the outer loop controller 53 derives the desired torque signal from using this value. It should be recognized by those skilled in the steering system arts the present invention permits system engineers the flexibility to readily change boost curves to meet the varying requirements of different types of vehicles.

The outer loop controller 53, taking input signals representing vehicle speed, steering torque, steering wheel angle and electric motor dynamics, including rotor position and velocity, compensates the assist torque value obtained from the look-up table to obtain the actual desired torque signal that is communicated to the inner loop controller 51. The outer loop controller consists of a phase lag network in series with a second order network.

The phase lag network may be characterized by the following relationship:

$$D(s) = \frac{\beta s + \omega_l}{s + \omega_l}$$

where $\beta<1$ and values for $\beta$ and $\omega_l$ are established based on the characteristics of the steering apparatus. The phase lag network has the effect of lowering the system gain at higher frequencies while having a gain of one in the frequency range of driver inputs. This improves stability by reducing the gain at the frequency which the system would normally oscillate (~50 Hz for our system). Therefore, $\beta$ and $\omega_l$ are selected to make response of the steering system fast enough to track driver steering inputs without exciting high frequency oscillations.

The second order network may be characterized by the following relationship:

$$D(s) = \left(\frac{\omega_p}{\omega_n}\right)^2 \frac{s^2 + 2\xi_n \omega_n s + \omega_n^2}{(s + \omega_p)^2}$$

where values for $\xi_n$ and $(\omega_p/\omega_n)^2$ are established based on the characteristics of the steering apparatus. This second order network may be derived from series lead, lag networks, or a combination thereof any sequence, as the case demands. In the presently preferred embodiment, setting $\xi_n \approx 1$ and the ratio of $(\omega_p/\omega_n)^2 = 20$ provide favorable performance. In developing the present invention, it was observed real poles and zeroes for the second order network proved ineffective at stabilizing the electronic assist steering power steering system. As an alternative, a lead-lag network was designed with complex zeroes.

Figure 5:
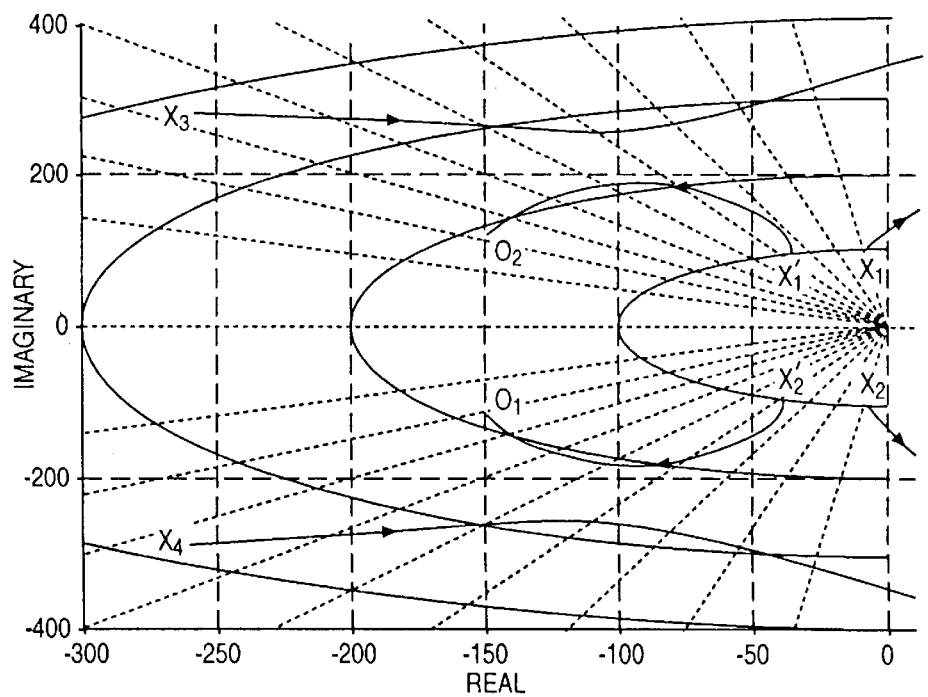
FIG. 5 is a root-locus diagram for an electrically assisted power steering apparatus in accordance with the present invention.

The design of the series phase lag network and the second order lead-lag network of the present invention can best be illustrated by way of a root-locus diagram for the system with and without compensation, as illustrated in FIG. 5. The characteristic equation for the power steering system has two low frequency roots, shown as $X_1$, $X_2$, which, when uncompensated, become unstable at very low gains, precluding the use of a boost curve such as that shown in FIG. 4. This can be seen from the root-locus diagram by observing that $X_1$, $X_2$ move asymtotically into the right half plane as assist gain increases. Typical gain requirements for the boost curve shown in FIG. 4 range from 0–80. The uncompensated system crosses into the right half plane when the gain exceeds 1.5.

To overcome this problem, the series phase lag network and the second order lead-lag network adds complex zeros $0_1$, $0_2$, which attract the lightly damped roots of the characteristic equation, now illustrated as $X'_1$, $X'_2$. This prevents the control system instability and vibrations for all desired gain ranges. The added poles $X_3$, $X_4$ will only become unstable at gain ranges that are outside the range normally desired for power steering applications. In the plot shown, $X_3$, $X_4$ are stable for gains less than 150, well above the desired range. The outer loop controller provides a system that provides the desirable gain for parking maneuvers as well as having sufficient damping for high speed operation, improving the steering feel of the system when operated at high speeds.

Although certain embodiments of the invention have been described and illustrated herein, it will be readily apparent to those of ordinary skill in the art that a number of modifications and substitutions can be made to the electronically assisted power steering apparatus disclosed and described herein without departing from the true spirit and scope of the invention. Such improvements, changes and modifications within the skill of the art are intended to be covered by the appended claims.

We claim:

1. An electrically assisted power steering apparatus for steering a motor vehicle, said electrically assisted power steering apparatus comprising:
    a steering mechanism;
    a steering torque sensor for detecting a steering torque applied to a steering wheel and generating a steering torque signal;
    an electric motor for generating an assistive steering torque for said steering mechanism;
    an outer loop controller for generating a desired torque signal responsive to said steering torque signal, said outer loop controller comprising:
        a phase lag network; and
        a lead-lag network in series with said phase lag network, said lead-lag network being characterized by having complex lead zeros; and
    an inner loop controller for generating a motor drive signal responsive to said desired torque signal and applying said motor drive signal to said electric motor.

2. An electrically assisted power steering apparatus for steering a motor vehicle as set forth in claim 1, further comprising a vehicle speed sensor for detecting a vehicle speed of the motor vehicle and generating a vehicle speed signal used by said outer loop controller for generating a desired torque signal responsive to said steering torque signal and said vehicle speed signal.

3. An electrically assisted power steering apparatus for steering a motor vehicle as set forth in claim 1, wherein said phase lag network is characterized by the following relationship:

$$D(s) = \frac{\beta s + \omega_l}{s + \omega_l}$$

where values for $\beta$ and $\omega_l$ are established based on the characteristics of the steering apparatus.

4. An electrically assisted power steering apparatus for steering a motor vehicle as set forth in claim 1, wherein said lead-lag network is characterized by the following relationship:

$$D(s) = \left(\frac{\omega_p}{\omega_n}\right)^2 \frac{s^2 + 2\xi_n \omega_n s + \omega_n^2}{(s + \omega_p)^2}$$

where values for $\xi_n$ and $(\omega_p/\omega_n)^2$ are established based on the characteristics of the steering apparatus.

5. An electrically assisted power steering apparatus for steering a motor vehicle as set forth in claim 1, further comprising a steering wheel position sensor for detecting a steering wheel angle and generating a steering wheel angle signal used by said outer loop controller for generating a desired torque signal responsive to said steering torque signal, said vehicle speed signal and said steering wheel angle signal.

6. An electrically assisted power steering apparatus for steering a motor vehicle, said electrically assisted power steering apparatus comprising:
    steering wheel for accepting driver input;
    a steering shaft having a first end connected to said steering wheel;
    a steering pinion attached to a second end of said steering shaft opposite said first end;

a steering rack matingly engaged with said steering pinion;

a steering torque sensor for detecting a steering torque applied to said steering wheel and generating a steering torque signal;

an electric motor for generating an assistive steering torque to supplement said driver input to said steering rack;

an outer loop controller for generating a desired torque signal responsive to said steering torque signal, said outer loop controller comprising:

a phase lag network; and a lead-lag network cooperating with said phase lag network, said lead-lag network being characterized by having complex lead zeroes; and an inner loop controller for generating a motor drive signal responsive to said desired torque signal and applying said motor drive signal to said electric motor.

7. An electrically assisted power steering apparatus for steering a motor vehicle as set forth in claim 6, wherein said assistive torque generated by said electric motor is applied to said steering shaft.

8. An electrically assisted power steering apparatus for steering a motor vehicle as set forth in claim 6, wherein said assistive torque generated by said electric motor is applied to said steering rack.

9. An electrically assisted power steering apparatus for steering a motor vehicle as set forth in claim 6, further comprising a vehicle speed sensor for detecting a vehicle speed of the motor vehicle and generating a vehicle speed signal used by said outer loop controller for generating a desired torque signal responsive to said steering torque signal and said vehicle speed signal.

10. An electrically assisted power steering apparatus for steering a motor vehicle as set forth in claim 6, wherein said phase lag network is characterized by the following relationship:

$$D(s) = \frac{\beta s + \omega_l}{s + \omega_l}$$

where values for $\beta$ and $\omega_l$ are established based on the characteristics of the steering apparatus.

11. An electrically assisted power steering apparatus for steering a motor vehicle as set forth in claim 6, wherein said lead-lag network is characterized by the following relationship:

$$D(s) = \left(\frac{\omega_p}{\omega_n}\right)^2 \frac{s^2 + 2\xi_n \omega_n s + \omega_n^2}{(s + \omega_p)^2}$$

where values for $\xi_n$ and $(\omega_p/\omega_n)^2$ are established based on the characteristics of the steering apparatus.

12. An electrically assisted power steering apparatus for steering a motor vehicle as set forth in claim 6, further comprising a steering wheel position sensor for detecting a steering wheel angle and generating a steering wheel angle signal used by said outer loop controller for generating a desired torque signal responsive to said steering torque signal, said vehicle speed signal and said steering wheel angle signal.

* * * * *